United States Patent
Rachamim

(10) Patent No.: US 8,321,200 B2
(45) Date of Patent: Nov. 27, 2012

(54) SOLVING CONSTRAINT SATISFACTION PROBLEMS FOR USER INTERFACE AND SEARCH ENGINE

(76) Inventor: Assaf Rachamim, Jerusalem (IL)

(*) Notice: Subject to any disclaimer, the term of this patent is extended or adjusted under 35 U.S.C. 154(b) by 218 days.

(21) Appl. No.: 12/810,318

(22) PCT Filed: Dec. 25, 2008

(86) PCT No.: PCT/IL2008/001670
§ 371 (c)(1),
(2), (4) Date: Aug. 11, 2010

(87) PCT Pub. No.: WO2009/083966
PCT Pub. Date: Jul. 9, 2009

(65) Prior Publication Data
US 2010/0324888 A1    Dec. 23, 2010

Related U.S. Application Data

(60) Provisional application No. 61/009,155, filed on Dec. 27, 2007, provisional application No. 61/009,164, filed on Dec. 27, 2007.

(51) Int. Cl.
*G06F 17/27* (2006.01)
(52) U.S. Cl. .................... 704/9; 704/1; 704/10
(58) Field of Classification Search .......... 704/1, 9, 704/10
See application file for complete search history.

(56) References Cited

U.S. PATENT DOCUMENTS

| | | | |
|---|---|---|---|
| 5,369,575 A * | 11/1994 | Lamberti et al. | 704/9 |
| 7,092,928 B1 | 8/2006 | Elad | |
| 7,177,798 B2 * | 2/2007 | Hsu et al. | 704/9 |
| 2002/0059069 A1 | 5/2002 | Hsu et al. | |
| 2005/0015238 A1 | 1/2005 | Meliksetian et al. | |
| 2005/0043940 A1 | 2/2005 | Elder | |
| 2007/0094184 A1 * | 4/2007 | Emek et al. | 706/45 |
| 2007/0106497 A1 * | 5/2007 | Ramsey et al. | 704/9 |
| 2007/0255555 A1 * | 11/2007 | Crouch et al. | 704/9 |

OTHER PUBLICATIONS

International Preliminary Examination Report for corresponding PCT application; 5 pages, report completed on Sep. 10, 2010.

* cited by examiner

*Primary Examiner* — Douglas Godbold
(74) *Attorney, Agent, or Firm* — Roach Brown McCarthy & Gruber, P.C.; Kevin D. McCarthy

(57) ABSTRACT

A method for interpreting a Natural Language by an artificial construct using constraint satisfaction problem solving, comprises a) providing a plurality of ways suitable to define at least a grammar for at least a Natural Language, b) providing a plurality of constraint satisfaction problem instructions c) providing a plurality of values for solving a plurality of constraints, d) converting said plurality of constraints to at least one constraint satisfaction problem pattern, e) receiving a Natural Language construct, f) unifying said plurality of constraints through said at least one constraint satisfaction problem pattern at execution runtime by the artificial construct to solve the constraint satisfaction problem, g) interpreting said Natural Language construct according to a plurality of constraint satisfaction problem instructions, and h) answering to a Natural Language construct by a Natural Language construct.

19 Claims, 15 Drawing Sheets

US 8,321,200 B2

SOLVING CONSTRAINT SATISFACTION PROBLEMS FOR USER INTERFACE AND SEARCH ENGINE

REFERENCE TO CO-PENDING APPLICATIONS

Priority is claimed as a 371 of international of PCT/IL2008/001670, filed on Dec. 25, 2008, which claims priority to (a) U.S. provisional patent application No. 61/009,155 filed on Dec. 27, 2007; and (b) U.S. provisional patent application No. 61/009,164 filed on Dec. 27, 2007.

FIELD OF THE INVENTION

The present invention relates to a method, system and apparatus for solving constraint satisfaction problems in an object-oriented environment, allowing flexible and unrestricted Natural Language Processing.

BACKGROUND OF THE INVENTION

Various attempts at Natural Language Processing (NLP) are known in the art. However, all of these attempts suffer from various drawbacks. For example, as described with regard to U.S. Pat. No. 7,092,928, Natural Language may be processed if restricted to a particular domain. Other attempts have related to such processing in the context of a limited grammar or vocabulary. However, there is currently no viable solution which can handle any type of NLP, without restriction.

It is therefore a purpose of the present invention to provide a method and system allowing to overcome prior art limitation in NLP field.

Further purposes and advantages of this invention will appear as the description proceeds.

SUMMARY OF THE INVENTION

The present invention relates to a method for interpreting a Natural Language by an artificial construct using constraint satisfaction problem solving. The invention provides a plurality of ways suitable to define at least a grammar for at least a Natural Language. The invention also provides a plurality of constraint satisfaction problem instructions, wherein at least one instruction relates to at least a grammar of at least a Natural Language. The invention provides a plurality of values for solving a plurality of constraints, wherein at least one set of zero or more values is provided during the interpreting process by the artificial construct. The present invention converts said plurality of constraints into at least one constraint satisfaction problem pattern, wherein said at least one constraint satisfaction problem pattern has a plurality of versions, receiving a Natural Language construct, unifying said plurality of constraints through said at least one constraint satisfaction problem pattern at execution runtime by the artificial construct to solve the constraint satisfaction problem, and wherein said unifying is performed sequentially on each version of said plurality of versions until said constraint satisfaction problem is solved. The present invention allows the interpretation of said Natural Language construct according to a plurality of constraint satisfaction problem instructions, wherein said interpretation comprises unification, and the present invention also allows answering to a Natural Language construct by a Natural Language construct. In the presentation said unifying step produces at least an object based on a plurality of constraints. Herein each version of an object and of said at least one related constraint satisfaction problem pattern comprises a plurality of conditions, and wherein said unifying process of said plurality of conditions comprises evaluating each condition to determine its validity, such that said unifying is performed until all conditions of a version are valid or until no further versions are available. According to the method of the present invention, at least one condition comprises at least one argument for determining the validity of said condition and at least one condition comprises at least one operator for determining a relationship between said plurality of arguments. An artificial construct comprises a hosting environment language for the implementation of said instructions. In the method described hereinafter at least one condition is obtained from said hosting environment language and at least one condition comprises a constraint satisfaction problem pattern.

According to an embodiment of the method of the invention at least one condition comprises a placeholder for receiving a value at the evaluation process for the unification step, and a placeholder comprises an object. Said object has a type and said unifying is performed according to said object type. In said embodiment at least one condition comprises an alternative version of at least one constraint satisfaction problem pattern. Furthermore, a value for said placeholder is selected from a plurality of values and said value for said placeholder is selected from a unification environment. In addition, said unification environment comprises a plurality of objects wherein said plurality of objects comprises objects at least a remote location from the artificial construct and local to the artificial construct. The remote location comprises a location on a computer network, wherein the artificial construct communicates with said remote location through said computer network. A plurality of objects is accessed according to a priority access order. The unification environment is modified at the evaluation process of said instructions.

All the above and other characteristics and advantages of the invention will be further understood through the following illustrative and non-limitative description of preferred embodiments thereof, with reference to the appended drawings. In the drawings similar elements are sometime indicated by the same numeral, for the sake of clarity.

DETAILED DESCRIPTION OF PREFERRED EMBODIMENTS

Definitions

Figure 1:
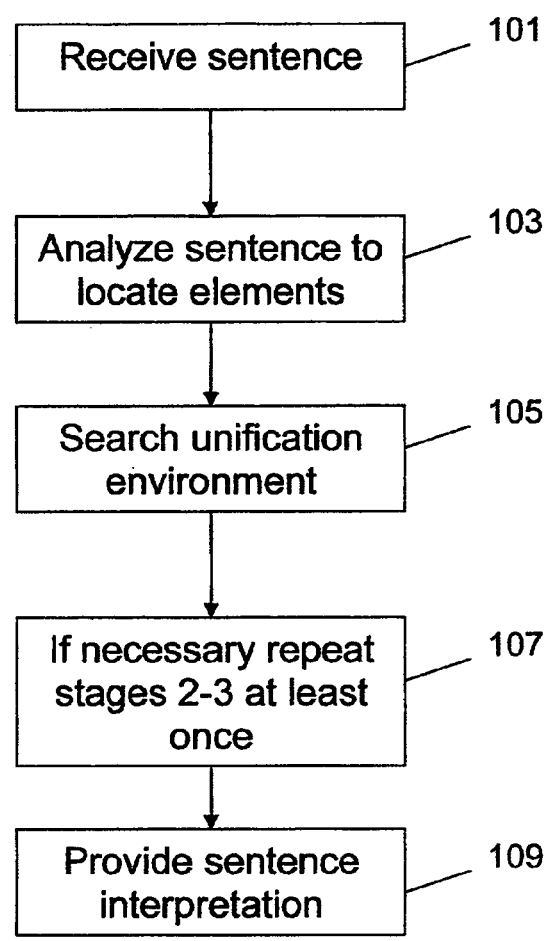
FIG. 1 is an example of a dataflow based on the method of the present invention.

"Natural language" (NL) means herein any spoken human language which can be available in a written form.

"Artificial Construct" (AC) means herein any computer, software, firmware or hardware capable of executing instructions.

"Natural Language Construct" (NLC) means herein any word, sentence, phrase, group of words, text and so forth.

"Object" means herein any type of object in any object oriented language.

"Natural Language Processing" (NLP) studies the problems of automated generation and understanding of Natural Languages. NLP is define as being one of possible methods for Human-Computer Interaction. However Natural Language recognition requires extensive knowledge to be efficient; this knowledge is provided to a system by a human expert.

"Constraint Satisfaction Problems" (CSPs) are problems where one must find solutions (states or objects) satisfying a number of criteria. CSPs require a combination of a large kinds of approaches in order to be solved in a reasonable time.

"Artificial Intelligence Oriented Object Calculus" (AIOOC) is an approach allowing to define and to solve CSPs in an object oriented environment, using a process referred to herein as unification. AIOOC supports Artificial Intelligence concepts within its basic formulas. In AIOOC objects are coupled to CSPs and said CSPs are defined using objects. The AIOOC atom is an AIOOC object. For simplicity the "object" is used hereinafter to refer to an "AIOOC object".

"User Interface" (UI) refers the ability of the present invention to supply tools for building none restricted domain Natural Language Processing interface for either human or machine user to interact or invoke dynamically any implementation of the present invention.

According to another embodiment of the present invention, there is provided a generic solution for CSPs which may optionally be implemented as software as described herein.

According to another embodiment of the present invention, the object CSP pattern is defined as a class data member for operational purposes, but it is not a field nor a method or any other similar construct. The object CSP pattern has a name and optionally a list of arguments. The pattern is an object member that during runtime, whenever invoked, should be evaluated into true or false values. Yet, it is not a method because it can have versions (unlike methods, as they require uniqueness of signature and argument list type). Therefore, the object CSP pattern is not a Boolean member field, nor is it a Boolean method. The object CSP pattern is a term with a unique syntax and unique evaluation process; therefore, it requires a definition of its own.

According to yet another embodiment of the present invention, pattern content is a list of one or more conditions. Each version of a pattern may optionally include different conditions and a different number of conditions. Pattern validity depends upon the validity of each pattern condition.

Pattern evaluation defines whether the pattern is valid (true) or not (false). Evaluation process for a given pattern is a logical AND sum of all conditions within the pattern according the order of their appearance. Whenever a condition is evaluated into false, it causes the current pattern to be evaluated into a false Boolean value. Therefore, the pattern is evaluated into a true Boolean value if and only if all conditions specified within that pattern are evaluated into true.

According to a further embodiment of the present invention, pattern versioning means that unlike any object-oriented field or member methods, the pattern may optionally have more than one version. Different versions allow the same pattern to be rephrased in a different way. Hence pattern content is different from one version to another. More specifically, conditions within one version may optionally and preferably be different than in another version.

According to an embodiment of the present invention, pattern version evaluation is preferably performed as follows. The evaluation process for a given pattern starts with the first version and continues sequentially until the last version (according the order or pattern version appearance in the code). The order of evaluation of pattern versions during runtime preferably follows their appearance in code. The programmer determines the version order as part of the construction of instructions, such as software for example, according to the present invention. The evaluation process for a given pattern stops whenever a specific version evaluation is true or if none of the pattern versions is true. Thus, the pattern evaluation process preferably stops whenever the version has been evaluated into a true Boolean value—therefore pattern is evaluated into a true Boolean value; or alternatively if all versions have been evaluated and none of them has been evaluated into true. For the latter situation, it is clear that the pattern evaluation is a false Boolean value.

The general form of an object CSP patterns is preferably as follows. The next definition describes an object pattern member "i". Pattern "i" has "n" different versions. Pattern "i" requires "m" arguments. All versions of a pattern should have the same pattern name and the same arguments list. Evaluation process starts with Pattern "i,1" and finishes with Pattern "i,n". Unless a valid pattern version has been found during evaluation process.

Pattern "i" is an Object CSP pattern which is pattern member "i" of a specified object type. Pattern "i" has n versions. Pattern "i,j" is version "j" of Pattern "i".

As an example, $X_1, \ldots, X_m$ is a list of 1 to "m" arguments that may be required for the pattern conditions. $C_{j,1}$, $C_{j,2}, \ldots, C_{j,n}$ is a condition list of version "j" for Pattern "i", where $C_{j,k}$ (0<k<n+1) would be a single condition. Therefore, as an example, a pattern P can be described as:

$$P_i(X_1, \ldots X_m) \rightarrow C_1, C_2, \ldots C_n;$$

According to still another embodiment of the present invention, an object CSP pattern may contain within itself one or more calls for other object CSP patterns, such that the object CSP pattern call is a type of condition. AIOOC allows part of the condition to be defined as one or more "holes"; said holes are the AIOOC unification placeholders.

According to another embodiment of the present invention, an object CSP pattern be invoked as a condition as described hereinbelow. Furthermore preferably a pattern may invoke other patterns and/or different versions of itself.

According to a further embodiment of the present invention, during the evaluation process of a set of constraints applied to a pattern, whenever the first version of said pattern fails, the evaluation process preferably continues to the next pattern version, if such exists.

As an example, an pattern called "inRange" is invoked in order to check if a value is in a predefined interval of values where the minimum value is 10 and the maximum is 20. This version of the pattern "inRange", is invoke as long as the checked value is under 20. When the checked value is higher than the maximum of the predefined range the output of pattern "inRange" evaluation process return a message such as "The number 21 is out of range".

According to yet another embodiment of the present invention, object pattern unification is used in order to solve CSPs. Said unification is used as an approach for satisfying the pattern "holes" with different potential matches. A possible match is taken from shared object pool that includes objects can be used for unification process. This pool is referred to herein as the Unification Environment (Env).

According to another embodiment of the present invention, the Unification Environment is dynamically changed during the evaluation process. Therefore, an object pattern member can be valid under a given Unification Environment and non valid under a different Unification Environment.

According to still another embodiment of the present invention, the unification placeholder replaces any object occurrence within a condition. This replacement requires knowledge of the appropriate type of the object to be used for this condition, but not the instance which make this condition valid.

As an example, a pattern is used to search for a square that fulfills simple criteria: square width is bigger than 5 and square height is bigger than 4. Another constraint is that the square instance is not known, so that it can not be passed as an argument to the pattern. If such a square exists during the evaluation process, said square is defined in the Unification Environment, according to the square constructor definition. In this example, "squareSearcher" is an object with a pattern for searching a square that answers previously mentioned criteria. "validSquare" is the pattern that defines mentioned criteria: width bigger than 5 and height bigger than 4. If required Square instance are known, the "validSquare" pattern could be defined as: validSquare (Square s) ➔ s.width>5, s.height>4. If 3 pair of data being respectively s1=(s.width=1, s.height=2), s2=(s.width=3, s.height=4) and s3=(s.width=6, s.height=7), only s3 satisfies all of the pattern's conditions.

According to yet a further embodiment of the present invention, the pattern definition may be extended with prefix and suffix. A pattern may optionally require local variable definitions used as conditions of a pattern. Such local variables may used before the conditions are evaluated, or after such evaluation, or both. Said prefix and suffix components contain one or more of a local variable definition, loops, initializations, etc. The pattern definition may optionally be extended such that it includes said suffix and/or prefix components. Hereby, as an example, an extended pattern P can also be described as:

$$P_{i,j}(X_1, \ldots, X_m) \rightarrow [\text{prefix}]\ C_{j,1}, C_{j,2}, \ldots, C_{j,p}\ [\text{suffix}];$$

According to an embodiment of the present invention, the method of in the present invention allows to unify the plurality of constraints in order to produces an object. Each version of the at least one CSP pattern comprises a plurality of conditions. Unifying the plurality of the conditions comprises evaluating each condition to determine its validity. Said unification is performed until all conditions of a version are valid or until no further versions are available.

According to another embodiment of the present invention, at least one condition comprises at least one argument for determining validity of the condition. Most preferably, at least one condition comprises at least one operator for determining a relationship between said plurality of arguments.

According to yet a further embodiment of the present invention, the placeholder comprises an object. Preferably, the object has a type and the unifying is performed according to the object type. More preferably, at least one condition comprises an alternative version of the at least one CSP pattern.

According to another embodiment of the present invention, the value used for the placeholder is selected from a plurality of values. Said value is preferably selected from a Unification Environment. More preferably, the unification environment comprises a plurality of objects. Most preferably, the plurality of objects comprises objects at one or more of a remote location from the artificial construct and local to the artificial construct. Also most preferably, the remote location comprises a location on a network, wherein the artificial construct communicates with the remote location through the network.

According to another embodiment of the present invention, the plurality of objects is accessed according to a priority access order.

According to still another embodiment of the present invention, the unification environment is modified at execution runtime of the instructions.

An operator is a rule that is invoked on condition or list of conditions during evaluation process. Operators within a pattern are preferably implemented as follows.

$$P_{i,j}(X_1, \ldots, X_m) \rightarrow C_{j,1}\ \&\&\ C_{j,2}\ \&\&\ \ldots\ \&\&\ C_{j,k}\ \&\&, \ldots, \&\&\ C_{j,p};$$

An operator Op on the top of condition Cj,k defined as:

$$P_{i,j}(X_1, \ldots, X_m) \rightarrow C_{j,1}\ \&\&\ C_{j,2}\ \&\&\ \ldots\ \&\&\ Op\ (C_{j,k})\&\&, \ldots, \&\&\ C_{j,p};$$

An operator Op on the top of more than one condition may for example be:

$$P_{i,j}(X_1, \ldots, X_m) \rightarrow C_{j,1}\ \&\&\ C_{j,2}\ \&\&\ \ldots\ \&\&$$
$$Op(C_{j,k}\ \&\&\ C_{j,k+1}\ \&\&\ C_{j,k+2}\ \&\&\ \ldots\ \&\&\ C_{j,k+v}) \ldots\ \&\&\ Cj,p;$$

As an example, the operator "Null?(1 argument)" returns true if the argument object is null. Use of this operator is defined such as:

$$P_{i,j}(X_1, \ldots, X_k, \ldots X_m) \rightarrow C_{j,1}\ \&\&\ \ldots\ \&\&\ \text{Null?}(X_k)\ \&\&\ \ldots\ \&\&\ C_{j,p};$$

As another example, the operator "!(0 arguments)" aborts the current evaluation even if all conditions until ! have been satisfied. It may optionally be used for example when unification placeholders are present within a pattern and during evaluation all available possibilities for unification within the unification environment are to be considered. Use of this operator is defined such as:

$$P_{i,j}(X_1, \ldots, X_m) \rightarrow C_{j,1}\ \&\&\ \ldots\ \&\&\ C_{j,p}\ \&\&\ !;$$

As another example the operator is "~ (1 argument)" and is the negation operator; it evaluates true to false into true:

$$P_{i,j}(X_1, \ldots, X_m) \rightarrow C_{j,1}\ \&\&\ \ldots\ \&\&\ \sim C_{j,k}\ \&\&\ \ldots\ \&\ C_{j,p};$$

In order to allow possible solutions for natural language (NL) problem description, the process preferably uses NL object unification according to meaning. Such unification preferably includes natural language unification as applied to object unification, by extending AIOOC object unification with object meaning for unification. AIOOC NL is an extension of AIOOC, allowing to describe and to evaluate problems using natural language. As distinguished from natural language domain approaches to interpretation, which are highly restrictive and limited in their ability to interpret natural language, the AIOOC NL supports interpretation of a generic subset of natural language that uses well-defined parts of the grammar rules of the language. Therefore, AIOOC NL is not limited to a closed set of words or to limited number of phrases.

An AIOOC NL program input is a natural language construct, such as a sentence in natural language, although optionally any natural language construct may be used. With regard to meaning of the sentence, any AIOOC NL object has natural language meaning description/s that matches the role and functionalities. These descriptions are embedded and/or attached to AIOOC NL objects (and its elements) and are accessible to analysis with meaning ground patterns.

Grammar is a well-defined subset of the natural language. Grammar, for the present invention, is preferably defined using AIOOC (set of patterns). Patterns match well-defined parts of the natural spoken language preferably at least partially according to one or more grammar rules. AIOOC NL Grammar preferably has at least two types of patterns. The analyze pattern deconstructs input sentences into potential atomic sentence components. These components represent natural meaning. This natural meaning can be divided into several categories. These categories refer to the type of the meaning. Any sentence component that refers to a natural meaning is preferably analyzed according to the meaning ground patterns.

The meaning ground patterns locate a match between an input sentence meaning component and actual AIOOC NL object/s that are present in the unification environment. For example, a simple grammar which contains one pattern may be used to find an object within unification environment where object meaning matches directly to sentence content. Such a grammar contains only one ground grammar that finds a match directly between the sentence and object-attached meaning, optionally without parsing. Therefore, the sentence analysis leads to ground meaning patterns that fulfill sentence meaning content with an actual AIOOPL NL object from the unification environment. The grammar may optionally have as many natural meaning categories as there are meaning ground patterns to resolve them.

The process of evaluation uses a given grammar to analyze and evaluate the input sentence. The grammar analysis preferably first examines that the input sentence is valid under the grammar definition. The grammar ground meaning patterns find which input sentence atomic components, considered as the natural meaning atoms, could be fulfilled and/or mapped into objects that are present in the unification environment.

Invocation is preferably performed as follows. When grammar analysis and meaning matches are completed, the process preferably invokes the actual objects, from the unification environment, with the appropriate arguments from the input sentence and in the correct sequence as described in the input sentence.

The AIOOC NL preferably provides, according to some embodiments, a dynamic ontology for problems description, analysis and evaluation. The AIOOC NL evaluation process allows the creation and invocation of programs that are dynamically been defined during runtime based on user input sentences and unification environment.

According to yet an embodiment of the present invention, a "word" is an atomic unit of a natural language, which may also be described as a single word element in the input sentence. The word may have a different meaning in different contexts, not to mention the differences between human natural languages. Words may be identical but may also have similar or identical meaning in the natural language.

According to yet another embodiment of the present invention, sentence is a sequence of words. Therefore a simple way to present a sentence object within AIOONL is to have a list (List) of Word objects. However, grammatical structure is also important. In order to analyze an input sentence using a grammar, usually the sentence is divided into sub sentences according to the grammar rules. During that process, more than one possible division may be determined. Therefore, preferably sentence enumeration may optionally be performed into an ordered sub sentence permutation. The length of the sentence preferably defines the number of sub sentences to be obtained for each permutation. Therefore, the number of sub sentences may optionally be from one up to the number of words in that sentence.

For example, a sentence comprises four words. All possibilities of dividing this sentence into two sub sentences such as:

Hello|AIOOC NL World

Hello AIOOC|NL World

Hello AIOOC NL|World

Different analysis pattern(s) may result in divisions of a sentence into different numbers of sub sentences. If the number of words is bigger than the number of such sub sentences, the result is that there is more than one way to divide the sentence. Therefore, such functionality support for the Sentence class may be quite useful when dealing with analysis patterns. Commonly, the grammar analysis pattern divides the sentence in a top down manner and in different ways until a match is found to a ground meaning pattern.

Meaning is any AIOOC NL object that can be used in the unification environment and which carries natural language meaning description/s that matches its role and functionalities. The description preferably has a natural sense or meaning when resolved with the appropriate grammar.

According to a further embodiment of the present invention, relevant elements that require a natural language description include but are not limited to object definition, member fields, member methods and method arguments.

Meaning is an attribute/metadata attached to the object definition, member fields, member methods and methods arguments, referred to as the attached meaning, or element-attached meaning. The element-attached meaning may optionally contain one or more strings that describe the natural language meaning of the specific element (as discussed earlier). Commonly, when an element-attached meaning carries more than one description, these different descriptions are probably synonyms. The element-attached meaning content is a sentence.

Element type is referred with regard to language definition. Therefore, an element type may optionally be an object definition, member field, method or method argument.

The element-attached meaning is preferably related to element type. Different grammars may consider different analysis for different elements. Therefore, the grammar meaning ground pattern refers to both element-attached meaning and element type. For example, method attached meaning may optionally be different from class definition attached meaning.

In "Dynamic element-attached meaning", "Dynamic" preferably refers to the fact that the element-attached meaning may optionally be changed during evaluation process.

While element-attached meaning may optionally be dynamic, sometimes the original meaning from the time of its definition is preferred, regardless of the dynamic changes performed during runtime. This initial meaning is preferably an element-attached base meaning or base meaning. Each element-attached meaning can be accessed as the base meaning or as the dynamic meaning.

An element-attached meaning can be understood and evaluated using the context of the element. If during the evaluation process the element belongs to a specific object instance, then the element attached meaning context is the actual instance for the object and/or is related to one or more meanings associated with the object. On the other hand, there are cases where a specific element-attached meaning does not require any context in order to be understood and/or evaluated. For such cases the attached meaning is context independent, and may be referred to as static element-attached meaning or static meaning. Static meaning may also optionally be defined and/or changed dynamically.

Matched meanings permit comparison of meaning of two different elements such as two different sentences. It relates to the "meaning" of the element and not to a simple comparison of characters as performed for example with string compare functions. In the simplest case, where two sentences contains an identical sequence of words, then the two sentences have the same meaning and therefore they have matched meanings.

FIG. 1 schematically discloses the method of the present invention for Natural Language interpretation. In a first step 101 a natural language construct such as a sentence is received. In a second step 103 the natural language construct is preferably analyzed to locate a plurality of elements. The analysis process is preferably performed according to the grammar for the natural language. Said grammar could be selected from a plurality of different grammars and may pertain to any type of language. Preferably the analysis involves selecting a ground meaning pattern. Optionally the plurality of elements may relate to a plurality of different and even overlapping configurations of the elements within the sentence, preferably for different versions of the analysis output. In a third step 105, each element is preferably searched in the unification environment for at least one matched meaning. Searching is preferably performed with regard to the ground meaning patterns. A selection of a Unification Environment may be made from a plurality of Unification Environments, preferably according to a look-up table and/or other order for selection. The method may optionally be performed with a plurality of different unification environments in order to find the most suitable environment and analysis, again preferably according to an order as determined above. Before stage 105, a search to a direct match to an interpretation may be performed. As an example, a search is performed according to any matching approach. A sentence or portion thereof which is found to have a meaning is stored in connection to the meaning, for more rapid searching in the future. If no meaning is found, then preferably stages 103 and 105 are repeated until a meaning is located (107). An interpretation of the entire sentence is then preferably provided in stage 109, in order to start an operation by another artificial construct.

According to one embodiment of the present invention, in order to be able to access the different elements and their attached meaning, there is need for support. Each AIOOC NL object that may be used by grammar meaning ground pattern is defined using a model metadata. Said model also known as "Meaningable module" should supply the support for accessing the attached meaning of itself and its members. The "Meaningable module" uses reflection and annotation to refer to the element attached meaning.

The "Meaningable module" also can supply support for meaning match, for checking the meaning match between elements attached meaning content and others such as sentences.

In AIOOC NL, the Grammar module is analyzing and evaluating an input sentence. Said grammar module provides a framework for defining and invoking a grammar based on grammar patterns.

The grammar module generates one or more tasks. Said tasks are the interpretation of a grammar into a well-defined sequence of invocations. This invocation sequence is the reflection of the input sentence by the grammar into objects, fields, methods and method arguments and the interaction between them.

Figure 2:
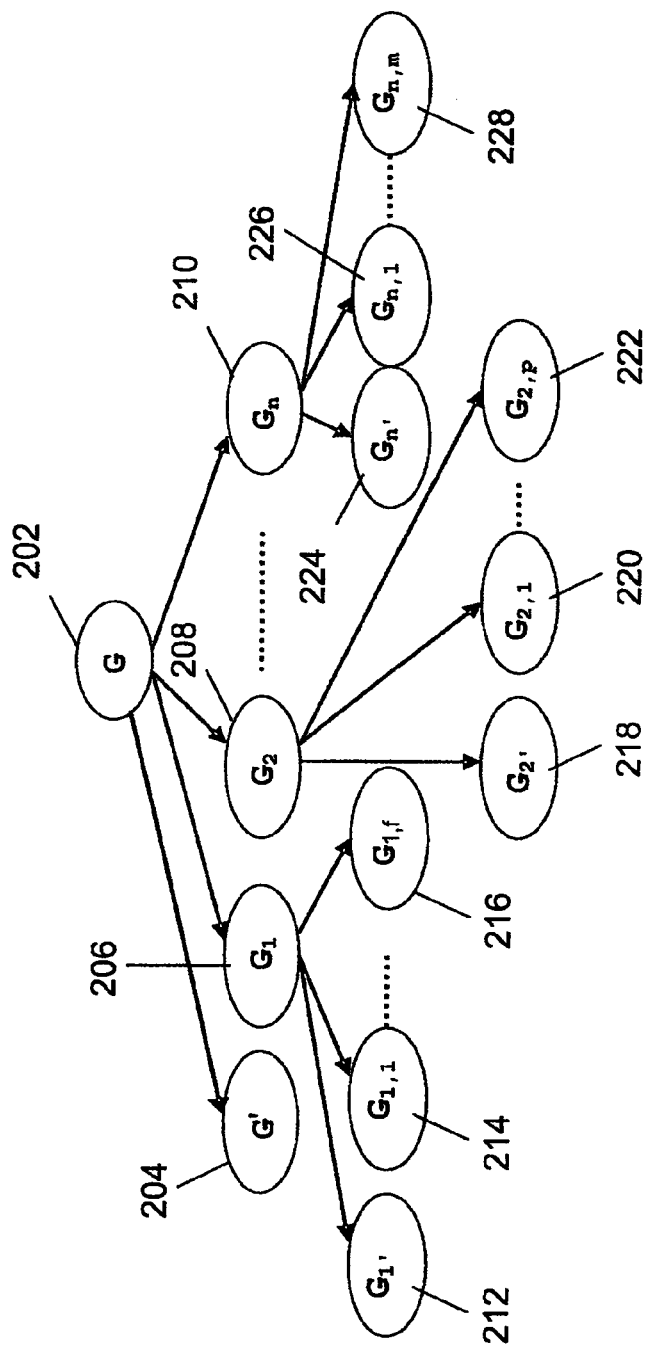
FIG. 2 is an example of a valid input sentence analyzed tree.
Figure 3:
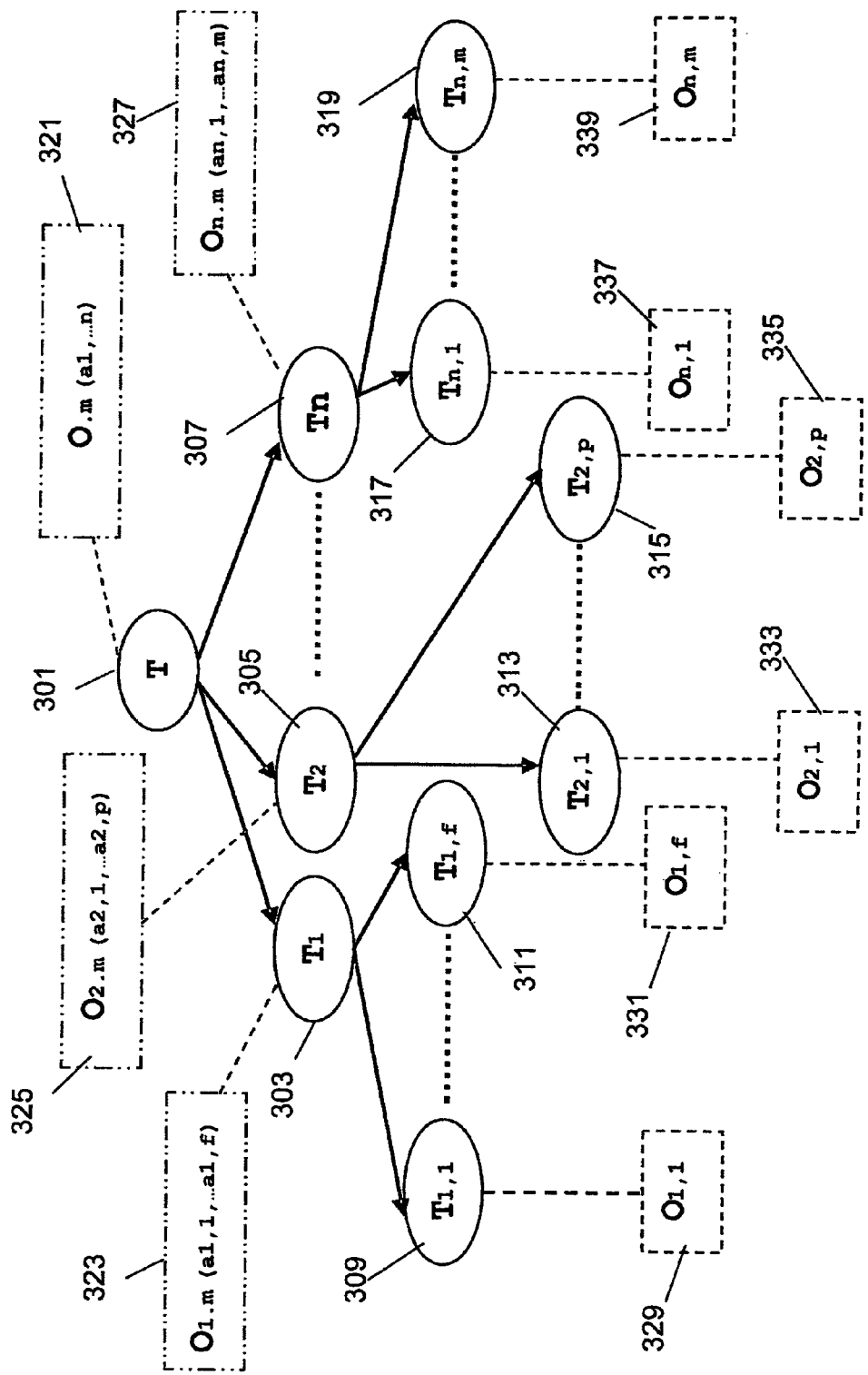
FIG. 3 is an example of a valid input sentence analyzed tree after node assignment.

According to one embodiment of the present invention, the task object is a grammar evaluation process result. During said evaluation process the grammar module in charge to generate the task object as a result ends with an invocation sequence that reflects the input sentence. As the meaning ground pattern assigns relevant parts of the input sentence into objects and methods, grammar processing can be described in a form of a tree (as shown in FIG. 2 and FIG. 3) where the leaves are objects that were found in the Unification Environment.

According to an embodiment of the present invention, the returned task object of the grammar instance when invoking the module processing the task represents the grammar parse tree result. This tree provides traced results of a successful analysis (and also a potential evaluation) of the input sentence. Therefore, task node of said tree should be evaluated and it should maintain its evaluation result. The present invention provides an overall interface for this purpose, while each grammar specific implementation defines the specific task node of said tree according to the specific grammar needs.

Grammar interpretation into the task tree has a canonical form, featuring two phases. The first phase is the analysis tree (as shown in FIG. 2). The analysis tree defines a successful division of the input sentence into components that follow the grammar down to the ground meaning patterns, which in turn, attach objects from the Unification Environment into tree leaves.

Assume that the Grammar module has a general format for grammar patterns; that all double index grammar patterns $G_{i,j}$ (206, 208, 210, 212, 214, 216, 218, 220, 222, 224, 226, 228) are ground meaning patterns; and that each G' 204 is evaluated into a ground meaning pattern from an object's method that requires one or more method arguments. These are preferably specified after the G' 204. For example: G' 204 is evaluated into object O with method m. m requires arguments $a_1, \ldots, a_n$:

Therefore, each pattern G represents a single invocation while double indexed patterns are ground meaning patterns that have the result already in the form of an instance out of the unification environment:

$G$ (202) ➔ G' (204), $G_1$(206), $G_2$(208), ..., $G_n$ (210);

$G_1$ (206) ➔ $G_1$'(212), $G_{1,1}$(214), ..., $G_{1,j}$(216);

$G_2$ (208) ➔ $G_2$'(218), $G_{2,1}$(220), ..., $G_{2,p}$ (222);

$G_n$ (210) ➔ $G_n$' (224), $G_{n,1}$(226), ..., $G_{n,m}$ (206);

Herein, there are no pattern versions; therefore the input sentence analysis has the same analyzed tree structure, while different Unification Environments may result in attaching different objects and methods to the tree.

FIG. 3 shows an example of a valid input sentence analyzed tree obtained from the above material has a general structure. In said tree of FIG. 3, $O_{i,j}$ (321, 323, 325, 327, 329, 331, 333, 335, 337, and 339) are appropriate objects that come from Unification Environment and match a relevant ground meaning patterns).

The grammar tree 300 represents a possible analysis output from the input sentence 301. The analysis is interpreted into possible combinations of the grammar patterns (321, 323, 325, 327, 329, 331, 333, 335, 337, and 339) on different input sentence components (303, 305, 307, 309, 311, 313, 315, 317, and 319). While the grammar is well defined, it is up to the grammar developer to decide how to use this grammar tree for building the Task nodes tree. The task nodes tree is the interpretation of the grammar tree into a set of instructions for execution.

According to a further embodiment of the present invention and with regard to the above example, a further description is provided according to the present invention for evaluation of the Task tree. Tree evaluation preferably connects the ground meaning pattern and the matched objects result into the arguments list of the parent analysis patterns. The object and method that use this argument list is the G' 204 corresponding pattern match result. All single index patterns become terms in the form of evaluation $(G_i)=T_i=O_i.m(a_1, \ldots, a_1)$. This process repeats itself when evaluating G.

Figure 4:
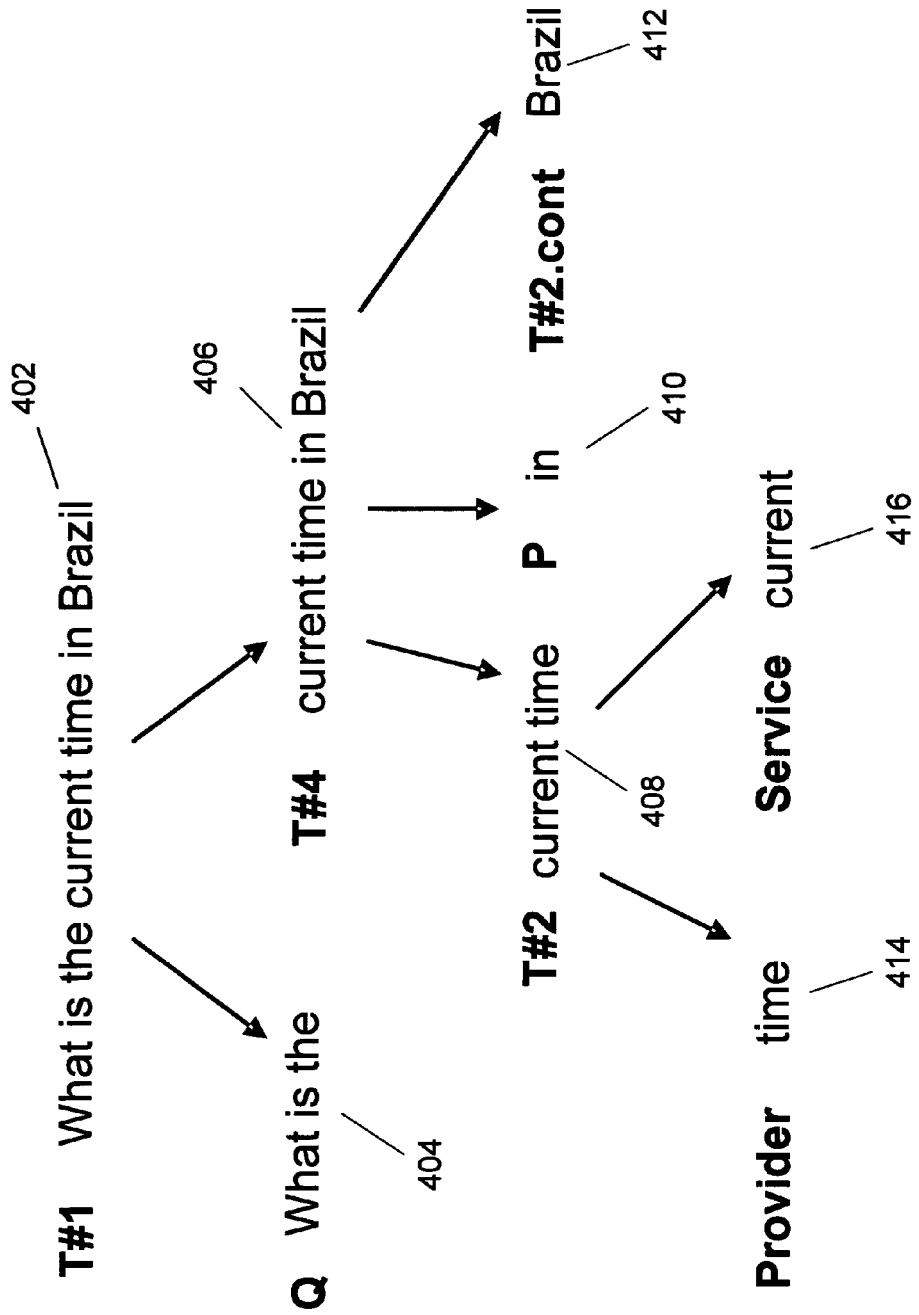
FIG. 4 is an example of operation done by the service provider grammar of the present invention.

According to style an embodiment of the present invention, therefore, each node in the evaluation tree is preferably both an object and method while node children are the relevant method arguments. In general case discussed here, the double index grammar patterns $G_{i,j}$ are leaves, that refer meaning ground patterns. Therefore the assignment of the node result into $O_{i,j}$ is done as shown in FIG. 4. The types and/or content of input sentences that can be analyzed and evaluated are related to the content of the Unification Environment. As an example, when the Unification Environment (UE) contains an instance of the "Clock" concept, said UE may include: "Time" 414, "What is Time" 408, "What is the Time" 404, "current time in Brazil" 406, "What is the current time in Brazil" 402.

More particularly, FIG. 4 shows how the sentence "What is the current time in Brazil" 402 is analyzed and evaluated. In a first task sentence 402 is split into two sub-sentences; the first one "What is the" 404 defining a question and the second one "current time in Brazil" 406 defining the object of the question. In a second task, "current time in Brazil" 406 is split into three sub sentences allowing to discloses which information is requested ("current time" 408, "in" 410 understood as "where?", "Brazil" 412). In a third task, "current time" 408 is decomposed in two atoms "time" 414 and "current" 416. This successive decomposition allows to define a provider, "Time" 414 instance from the Unification Environment, a service as "current" 416 which is a method and an argument, "Brazil" 416.

Figure 5:
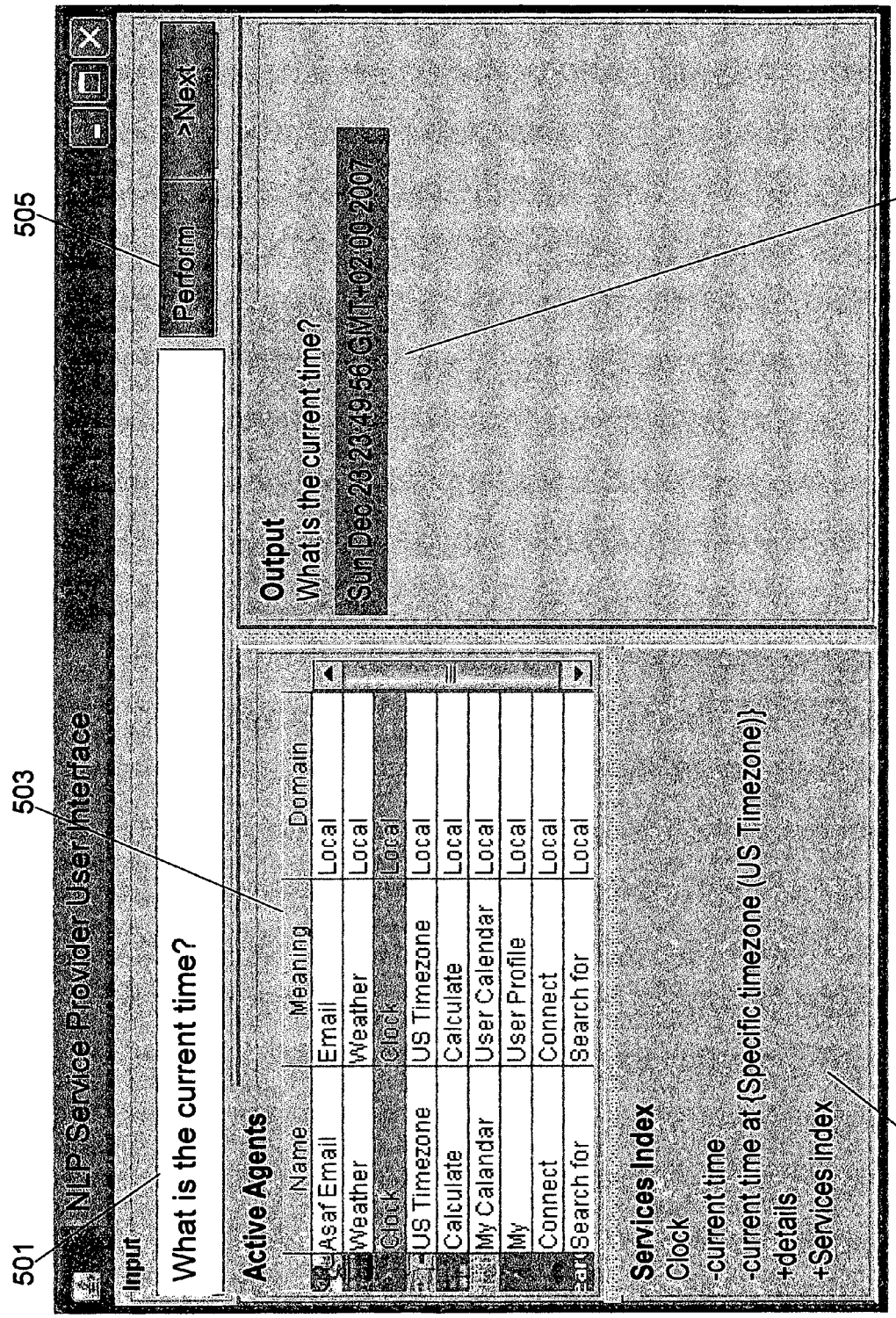
FIGS. 5, 6, 7A, 7B, 7C, 7D, 7E and 7F show exemplary, illustrative screenshots of a generic UI according to the present invention.
Figure 6:
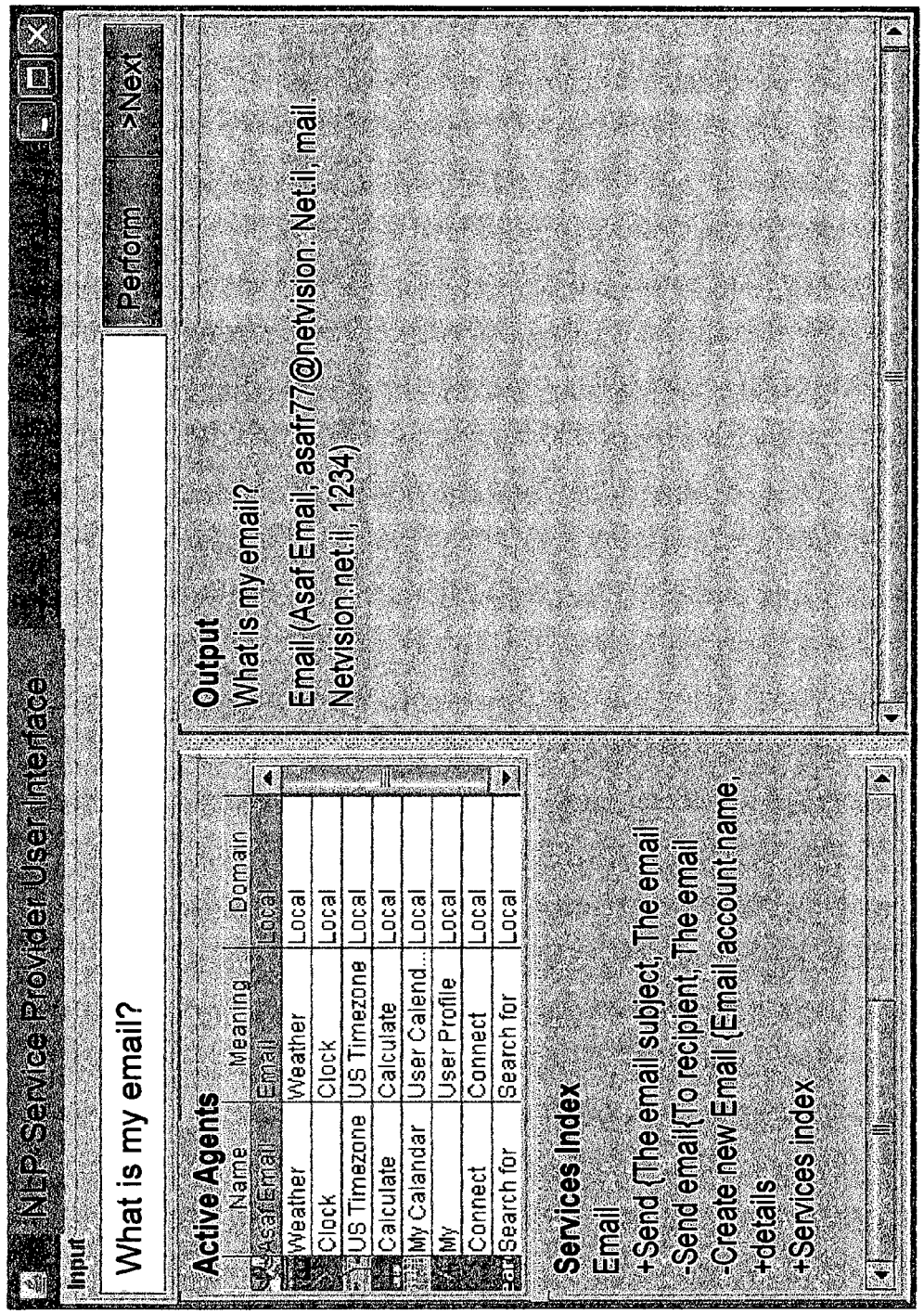

FIGS. 5 and 6 are showing examples of implementations of the "NLP Service Provider User Interface". In a first step the user input a sentence in text field 501 (respectively 601), in a second step the user start analysis by clicking on "perform" button 505 (respectively 605). Evaluation and analyze of the input 501 (respectively 601) is done and shown in the service Index area 507 (respectively 607). The Active Agents list 503 (respectively 603) shows which agents where involved in the process in order to disclose an answer in the output field 509 (respectively 609).

According to a further embodiment of the present invention, the order of processing is preferably bottom up, although top down is also possible. For top down evaluation, missing arguments may optionally be requested from the user of the method of the present invention or deducted from the unification environment. Top down evaluation may be more implementation specific and also related more to specific grammar and runtime environment heuristics. In any case, either type of processing is possible, especially in cases where method arguments are missing or there is support for grammar ambiguity.

According to yet an embodiment of the present invention, since initially no tree structure is defined, a task interface is necessary to build an evaluation tree.

According to still another embodiment, in order to allow to build an evaluation tree it is necessary to define a simple grammar (SG) having two ground meaning patterns containing the support for task object and its evaluation. In the second G pattern, there is a prefix as discloses hereinabove. That prefix iterates the different possibilities to divide input sentence into two sub sentences, in which a first part matches the object meaning and the second part matches to some method within that object.

According to a further embodiment, the present invention provides a Service Provider Grammar (SPG). A Service Provider may be any entity which provides any type of service, preferably through some type of automated interface wherein a simple grammar SG is implemented. Preferably, said service includes customer service (for example for a customer of an organization). The automated interface may optionally include one or more of an interface through a computer which may optionally be visual, audible, tactile or a combination thereof, an audio interface of some other type such as a simple fixed line telephone, a tactile interface of some other type and so forth. Preferably the interface is provided on-line through a computer network as described herein. The automated interface optionally and preferably includes at least one response which is determined automatically from an input by a user, such that the response is determined according to embodiments of the present invention as described herein.

The SPG is an example for a possible natural language application in AIOOPL NL for a service provider. The platform can be any AIOOPL NL porting, while SPG adds its unique grammar to the user interface.

As an example, an on-line customer service such as a website can SPG along with related AIOOPL NL objects during analysis and evaluation process, in order to reflect certain behavior and invocation possibilities through the specified AIOOC NL grammar rules specifically defined for particular services delivered to customers.

According to yet another embodiment of the present invention, SPG preferably maps the object of the process attached meaning into a "provider meaning" and preferably maps a set of operations attached meaning into a "service meaning". This section explores SPG and suggests an example for implementation.

The SPG is a generic approach for how a Human Service-Provider natural language interactions with an automated interface may be implemented through the AIOOPL NL Grammar. Human Service-Provider natural language interactions view the world as a collection of providers, wherein each provider maintains a plurality of services. The specific SPG grammar provides an additional implementation example for the general grammar rules and embodiments described herein.

According to an embodiment of the present invention a SPG is not restricted to any fixed language structure or to any kind/type of domain.

As described above, the SPG provides a particular implementation for different attached meaning types. An object's attached meaning is considered to be the natural meaning for a specific Provider. A rule attached meaning is considered to be a natural meaning for the Provider's service.

As an example of an embodiment of the present invention, the "BookStore" is a book provider described in the natural meaning "Book store". The Book Store in this example maintains three services:

"buy a book" (the set of rules "buyBook")

"buy a magazine" (the set of rules "buyMagazine" attached meaning)

"query for book by SN" (the set of rules "queryBook" attached meaning) wherein "SN" is a serial number, one of the identifier of a book such as a title, could optionally be used.

None of these rules require any arguments. It is assumed that the body of each method contains relevant code that interacts with the user for the rest of the operation.

A simple SPG version can be easily defined for invoking such services by using simple input sentences that are common in natural language.

Assume the SPG is expected to support sentences in the form of:

"buy a book from Michael's book store".

The method of the present invention enables grammar patterns to be created that can analyze and evaluate the sentence and also support its invocation.

As an example the input sentence "buy a book from Michael's book store" can be splitted in three segments: (1) "buy a book", defining the Service meaning (2) "from", defining the proposition (3) "Michael's book store", defining the Provider meaning. The above form of a sentence may be converted or analyzed to a pattern in the form of:

Service meaning && Preposition Word && Provider meaning

A simple SPG grammar that supports such analysis and evaluation may optionally be implemented as follows:

A comprehensive SPG is likely to receive a much more complicated sentence structure. If the above "BookStore" rules would have required arguments, then "SimpleTask" and the disclosed single SPG pattern are not sufficient to handle such rules.

Therefore, AIOOPL NL Service Provider preferably has a framework of support to allow the specific SPG extension. The framework of support should be applicable to any SPG while it should also be easily ported into the AIOOPL NL hosting language. This framework of support is described below in more details.

According to yet an embodiment, the present invention uses a framework supporting at least two main steps:

Analysis: handling meaning within complex input sentence structure; and

Evaluation: supporting generic interpretation of grammar tree into a task tree.

The analysis framework support adjusts Meaningable set of rules according to the Service-Provider terminology. Therefore, it is straightforward for SPG user implementing grammar and using the same in order to use it in ground meaning patterns. Each AIOOPL NL SP object which is to be used in the Unification Environment should extend said set of rules.

According to one a further embodiment of the present invention, the evaluation support is related to the generic interpretation of the grammar tree into a task tree. Service Provider Task (SPTask) is an exemplary implementation for being used within SPG patterns in order to interpret the grammar tree into Task tree. There are a few optionally but preferred requirements for SPTask:

1. An application interface allowing to implement Service-Provider terminology;

2. Ability to maintain tree of SPTask nodes in the general form for the evaluation process;

3. Support for arguments that follow definitions for the evaluation process.

The result is that SPTask is preferably able to maintain the evaluation term in the form of: $O.m(a_1, \ldots, a_n)$. Argument $a_i$ (0>i<n+1) can be either evaluated already, such that it is an object, or an input sentence component that should be evaluated, hence SPTask. The SPTask evaluation step first evaluate all arguments which can be evaluate according to the type of data.

Therefore, each SPTask performs argument evaluation and each argument which is of the SPTask type does the same. That evaluation continues until the evaluation tree combines into the form of the general term as described above:

$$O.m(O1.m(O_{1,1}, \ldots, O_{1,l}), O_2.m (O_{2,1}, \ldots, O_{2,p}), \ldots, O_n.m (O_{n,1}, \ldots, O_{n,m}))$$

As an example of a different SPG ground meaning patterns, the next patterns also include the interpretation part of grammar as part of the processing for the Task tree.

According to an embodiment of the present invention, a static service is a static object's set of rules. Therefore a provider attached meaning is not required in order to analyze the service and invoke it. As explained previously a rule such as "currentTime" is static. Also, the method's attached meaning (service meaning) "current time" does not require the object meaning (provider meaning) in order to have a Natural Language context. It is sufficient for the user to ask for "current time" instead of "Clock current time". The SPG static service definition follows the Static element-attached meaning definition hereinbefore.

As mentioned, the SPG is not fixed grammar or domain specific. SPG is a general example for an entire family of possible Service-Provider Grammars. All such grammars preferably follow the Service-Provider concept in that the form of an object is the provider, the method is a service while maintaining a subset of natural language. The number of possible specific SPGs is probably enormous, with regard to natural languages combined with SPG meaning ground patterns.

As an example of the previous description the current example relates to an illustrative system of the present invention for natural language interpretation for a customer support function as the service provider. A system features a client computer for being operated by a user who is a client of a service provider. Client computer preferably operates a user interface which is more preferably a Web browser and/or other software for at least viewing mark-up language documents. User interface may optionally comprise any type of interface, such as speech to text, lip reading, interpretation of sign language and/or any other audio, video and/or tactile interface.

The client user preferably issues one or more requests or commands through user interface, which are then transmitted to a server of service provider through a computer network, which may optionally be the Internet and/or a cellular telephone network for example. Server preferably comprises a natural language interpreter according to the present invention. Natural Language interpreter preferably interprets the one or more requests or commands for meaning as described in greater detail hereinbelow. For example, if upon interpretation of the request of the client user, more than one possible response may be made, then selecting the response preferably includes selecting one or more elements from database for constructing a response. A "match" to an appropriate response may also optionally be made according to the relative score and/or other method for evaluating similarity. Also optionally more than one response may be considered to be suitable.

Optionally, a meaning may be selected directly from database as well, for example according to the previously described hash function.

Next, natural language interpreter preferably packages a response to be sent to client computer, optionally through a network interface as shown to network. The response may optionally include written text and/or images and/or other visual information, and/or audible information (such speech for example) and/or tactile information. The operation of natural language interpreter is preferably mainly and is more preferably completely automatic, generally without requiring direct human intervention or interaction at service provider.

Also if necessary or desired, once at least one interaction between Natural Language interpreter and the human user of user interface has been performed, or optionally while being performed, Natural Language interpreter may optionally send an alert to a human and/or automatic response mechanism. For example, Natural Language interpreter may optionally send a message or alert that repair personnel are required at a particular location, or may optionally indicate that a person needs to contact the human user of user interface.

Also optionally, Natural Language interpreter is able to consult with other natural language interpreters and/or other unification environments in order to obtain the necessary information.

According to yet another embodiment of the present invention, in a first step, a human client interacts with an interface of a computer, for example to send a request or other message.

In a second stage, the request or any other message as an input is received by the service provider (AIOOPL NL SP), preferably by the natural language interpreter.

In third stage, the natural language interpreter preferably analyzes the input to locate one or more elements therein. Optionally, a plurality of elements is located, preferably with a plurality of overlapping components, such that for example a word may optionally appear in more than one element. Optionally in stage 3, the input is compound, featuring more than one sentence and/or more than one action or other input item within a sentence for example. For such compound input, preferably the input is first decomposed to a plurality of sentences and/or input items within sentences.

In a fourth step, the natural language interpreter uses at least one and more preferably a plurality of ground meaning patterns to search through a unification environment for meaning for the elements. Information for the Unification Environment is preferably maintained in a database or other storage location, which may also optionally have one or more policies as described below. Optionally, more than one Unification Environment is considered, preferably through selection according to a look-up table and/or other predetermined order. If a particular Unification Environment provides only a partial result for located meaning, optionally also with regard to similarity or degree of similarity, then preferably another Unification Environment is selected for searching with a ground meaning pattern. Optionally, each ground meaning pattern is selected in turn for searching through one or more unification environments, for example optionally according to one or more policies such as configuration policies. If a ground meaning pattern does not result in a match and/or similar meaning being located in any available unification environment, then preferably another ground meaning pattern is selected and the searching process is restarted.

In fifth step, the task tree is preferably evaluated, such that the terms obtained from searching through the Unification Environment are evaluated.

In sixth stage, if a match and/or sufficiently similar meaning is located, then a system response is optionally and preferably determined by the natural language interpreter. The response may optionally include an alert or other message for being sent to another location, for example to a human and/or to an automated response. The alert or other message may also optionally indicate whether a further action is required or desired. For example, service personnel could optionally be sent to a location for a repair, and/or statistics regarding feedback, for example with regard to complaints. Also the alert or other message could result in a request for other information or interpretation from another component or part of the service provider.

In stage 7, additionally or alternatively to stage 6, if a match and/or sufficiently similar meaning is located, then a user response is optionally and preferably determined by the natural language interpreter (or optionally another component of the system). The user response may optionally include a request for further information, for example when the user refers to a product by name but more than one model or type of the product are available. The user response may also optionally include an answer, or even more than one answer. For the latter, the answers may optionally be listed in the order of received score or other prioritization.

The above process may optionally be continued with one or more further interactions between the user and the service provider system. The interaction(s) and/or results thereof may also optionally be added to the unification environment, for example as information for being stored in a database. It should also be noted that the above process could optionally and preferably be used to construct a completely dynamic, real time, "on the fly" interface between the system and the user, preferably without requiring any previously programmed rigid interface or other predefined structure.

Figure 7A:
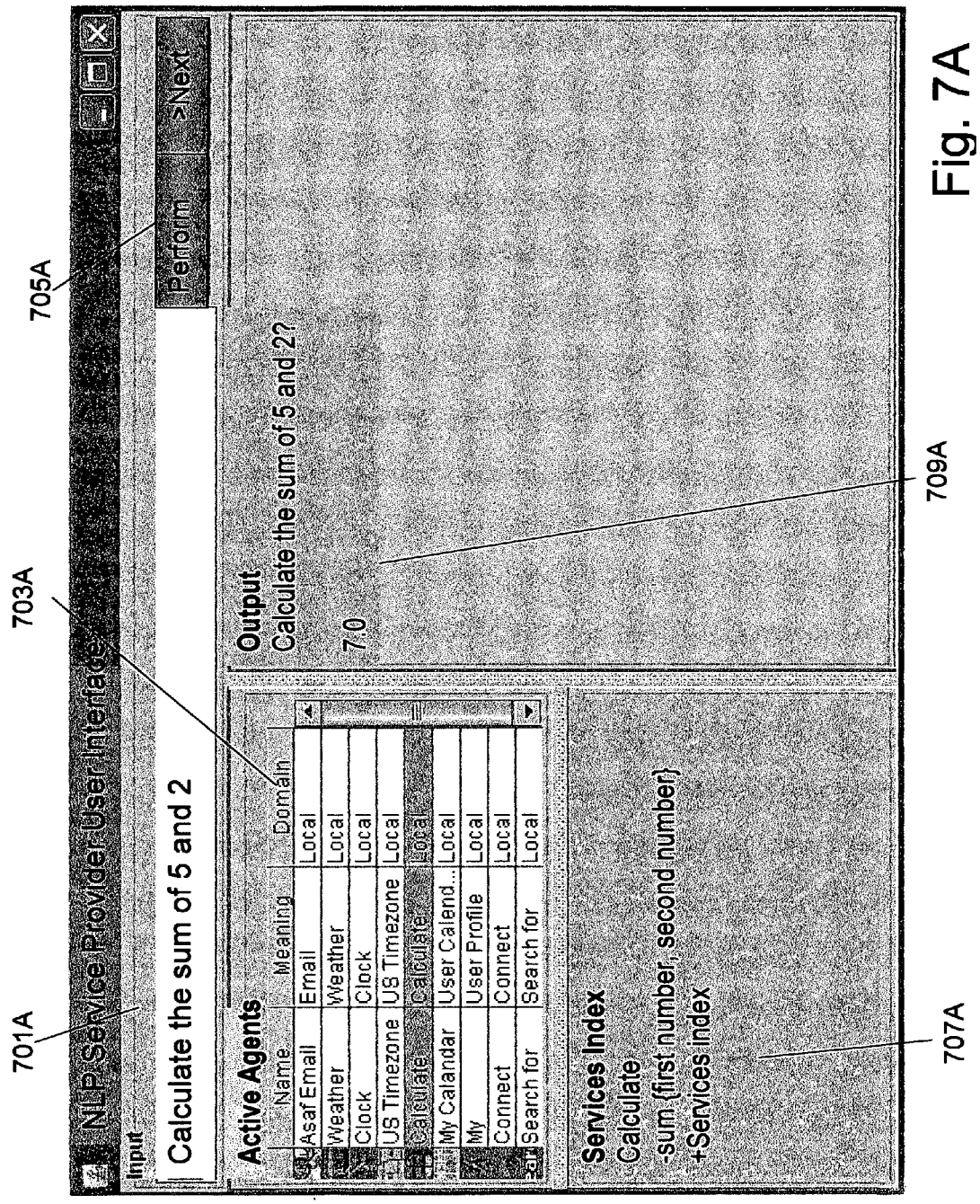

FIG. 7A shows an exemplary generic UI related to another input command, for "calculate the sum of 5 and 2"(701A). Currently the "calculate" provider 703A has been selected as shown and so the calculation services are listed. Validating the input sentence 707A by clicking "Perform" button 705A disclosed the processing results 709A.

The input command is of the form <Provider> the <Service> <argument> and <argument> and ... and <argument>. This is another example for a task pattern in this application SP grammar. The calculate provider sum service requires two arguments. Arguments are supplied with the word "and" to separate them in this example. The term "sum" is a static meaning (sum of x and y), such that the user may optionally only provide the command "sum of x and y" without the word "calculate" if supported by the grammar.

Figure 7B:
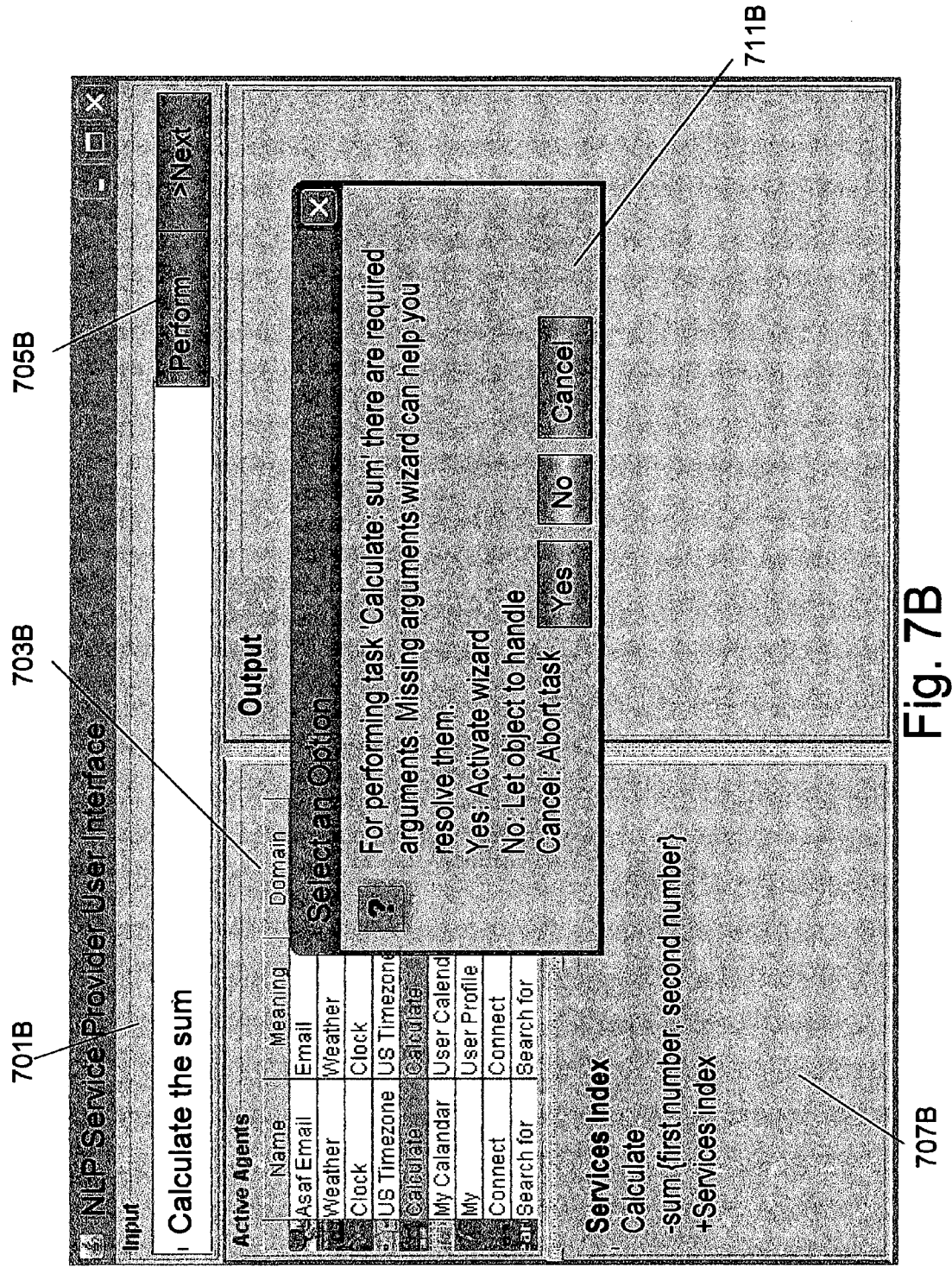

FIG. 7B relates to an example of an assistance function of the generic UI (also called "wizard") of the present invention, according to some embodiments. For this example, the user has entered the input command: "Calculate the sum" 701B and has clicked the "Perform" button 705B. However, in this example the command is not complete, so the user interface program preferably operates a "complete arguments wizard" that supports completion of the command for invocation. There are three options provided in a select options display 711B as shown:

Yes: User will supply the inputs

No: an automatic search will look for arguments that fix the meaning definition of the missing arguments and will auto fulfill them (if they exist)

Cancel: abort the task, hence, stop performing the input command

Figure 7C:
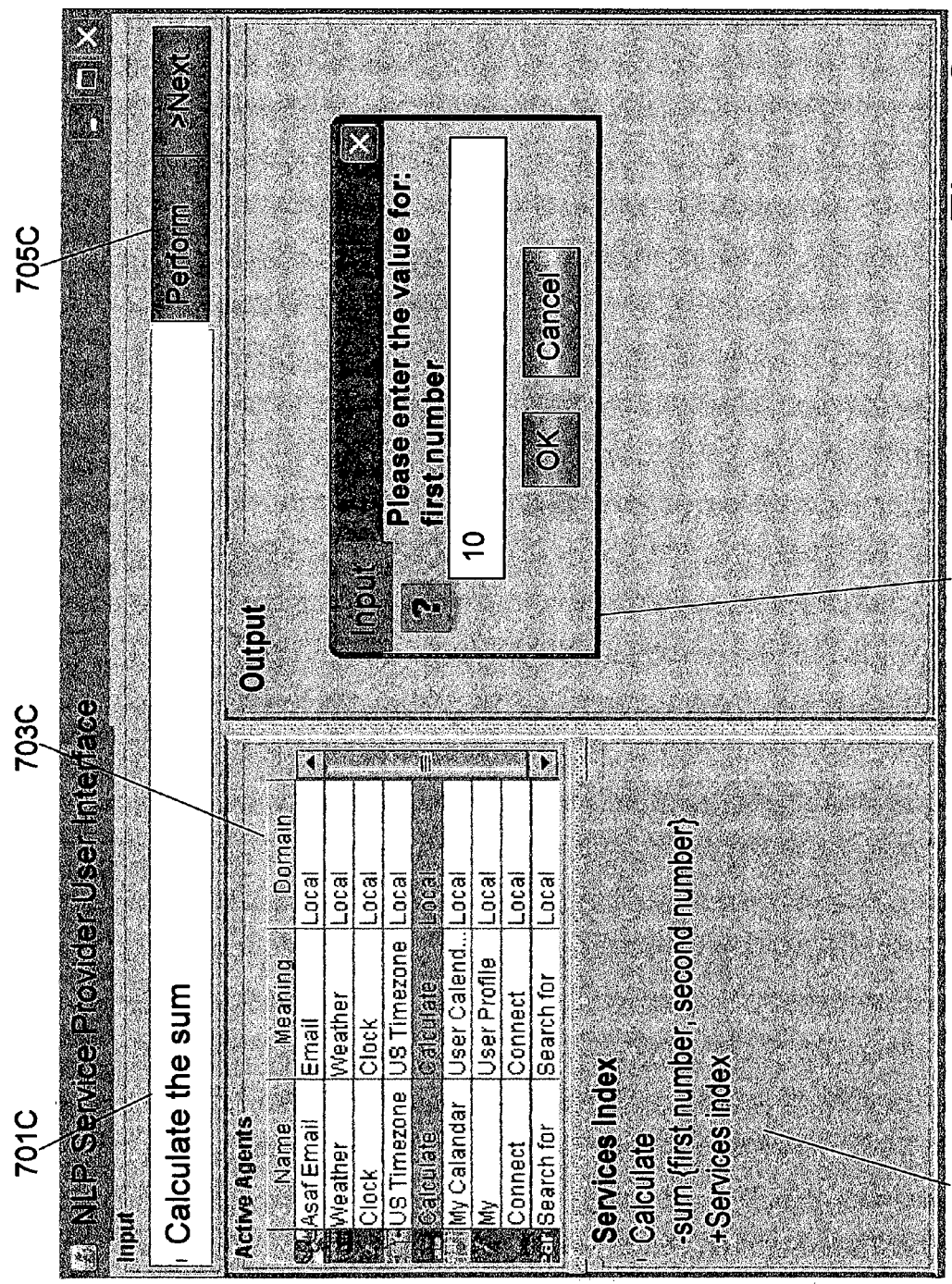

For this example, the user is assumed to have clicked "Yes" as the user wishes to select numbers. Therefore, in FIG. 7C an input dialog box 711C is provided in order to collect inputs according argument meaning of the related service (sum). The user enters the value, as an example, 10 to input dialog box 711C, and clicks or otherwise selects the "OK" button.

Figure 7D:
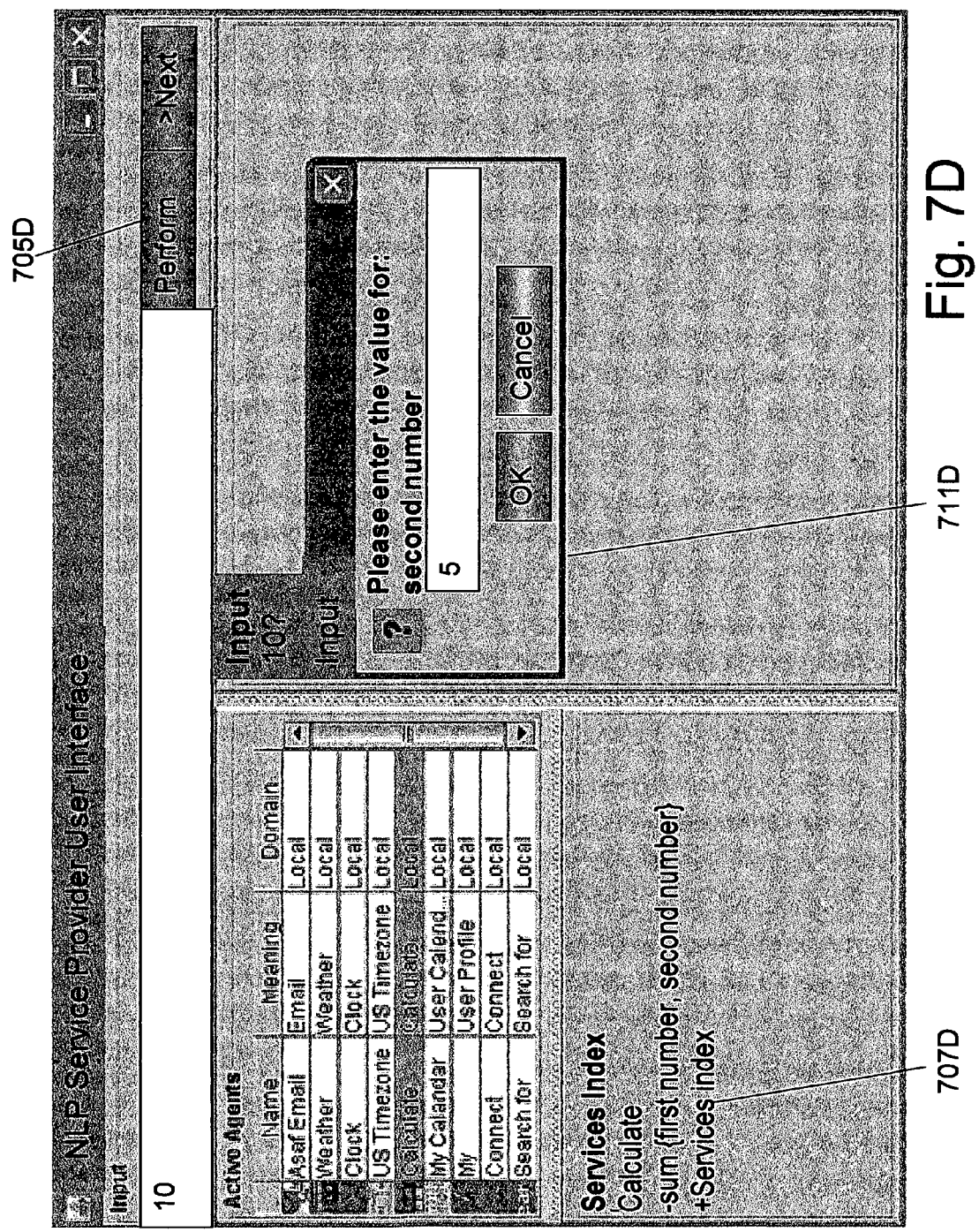

Now in FIG. 7D, a second number is requested as it is the second argument as defined in the "sum" service (for the sake of clarity, reference numbers in this Figure are identical to those in Figure &C). In this example the user enters the value 5 to input dialog box 711D or 711D, and clicks or otherwise selects the "OK" button.

Figure 7E:
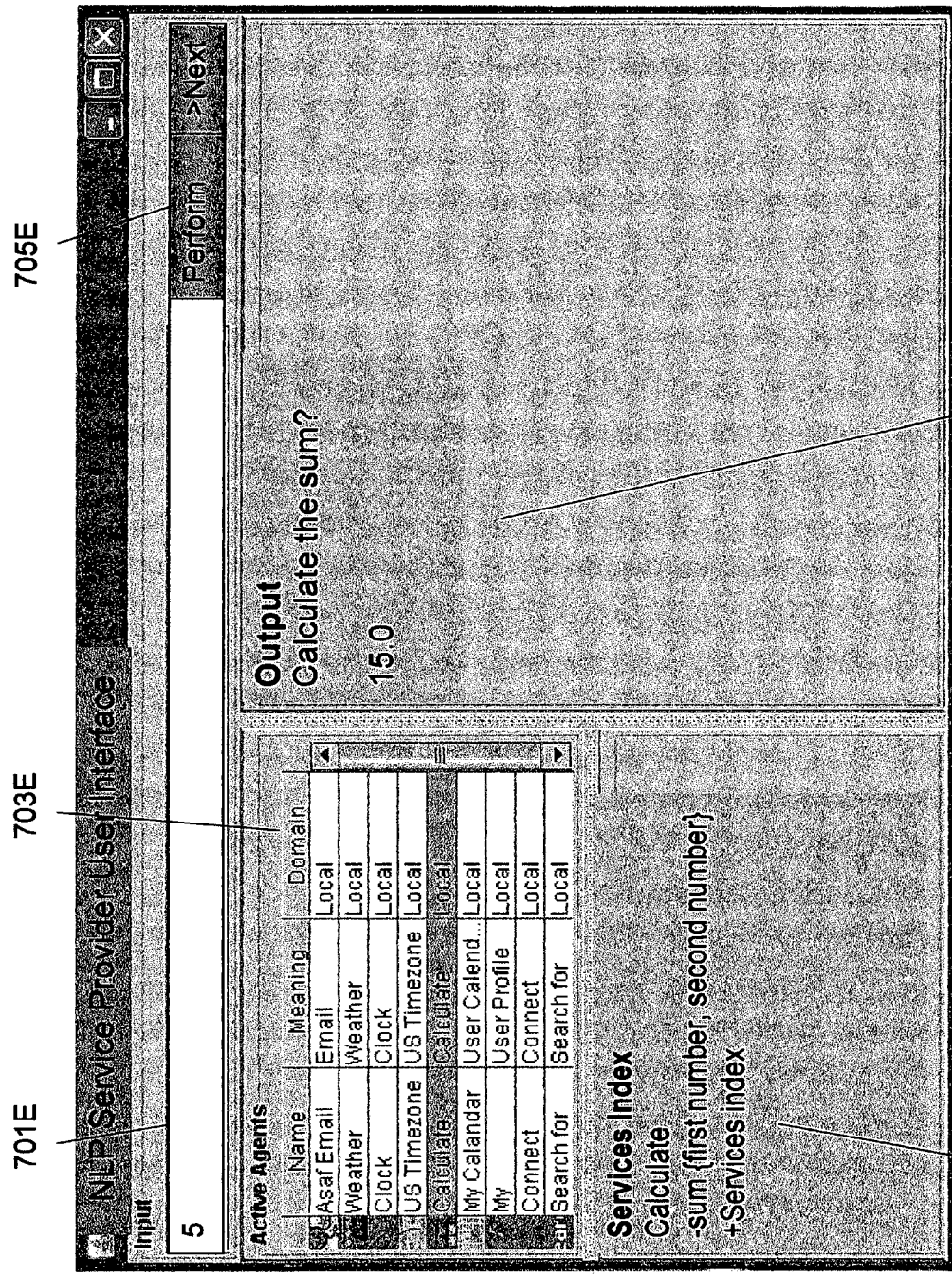

The "wizard" for completing the arguments has now finished its tasks, therefore the user interface program continues to evaluate the input sentence using the UI grammar and the arguments supplied by the user. The result is shown in FIG. 7E.

Figure 7F:
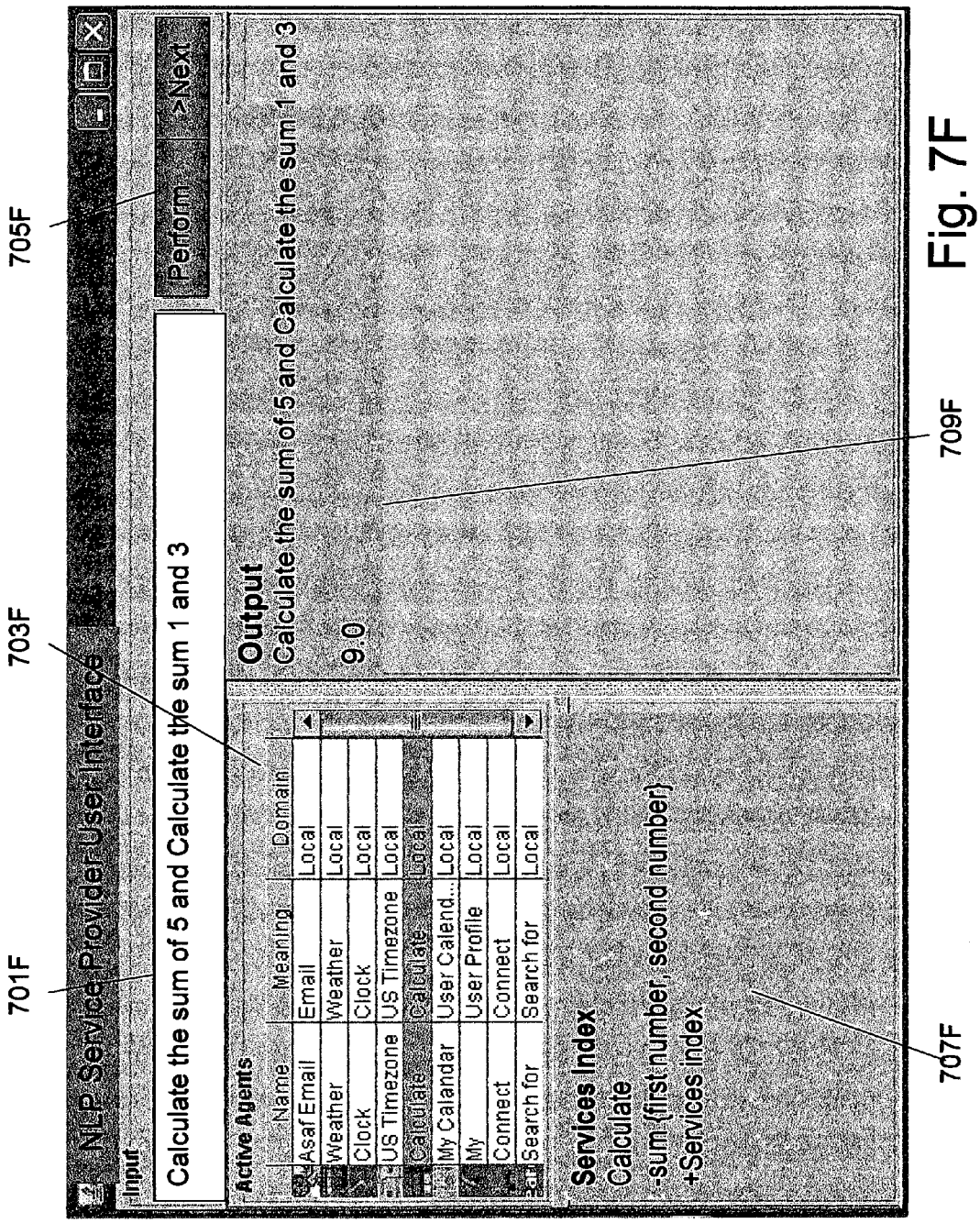

According to another embodiment of the present invention, one sentence or command may optionally be embedded or nested in another sentence or command. The exemplary grammar show herein supports nested instructions in natural language. A non-limiting example of such a nested command may have the form of "perform X action by using the result of Y process, after first checking the value of Z". The order of such a nested command is only important if so implemented in and required by the grammar. FIG. 7F relates to an example of nested grammar constructs in an input command. The input sentence for the example in FIG. 7F is: "Calculate the sum of 5 and Calculate the sum of 1 and 3" (701F). This is a nested instruction, such that the second argument for the initial calculation is "Calculate the sum of 1 and 3". It may be shown with parentheses to isolate arguments: "Calculate the sum of (5) and (Calculate the sum of 1 and 3)". The user interface program then operates as described above, after deconvoluting the nested arguments.

Figure 8:
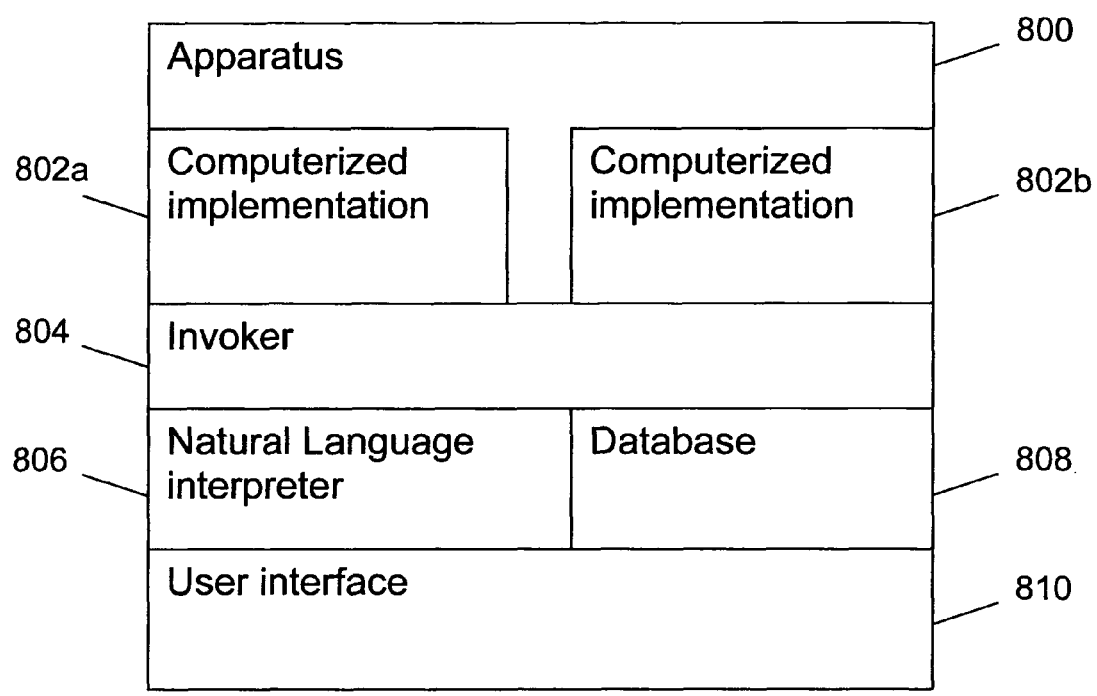
FIG. 8 shows an exemplary, illustrative apparatus for a user interface to be operated by a user computer according to some embodiments of the present invention.
Figure 9:
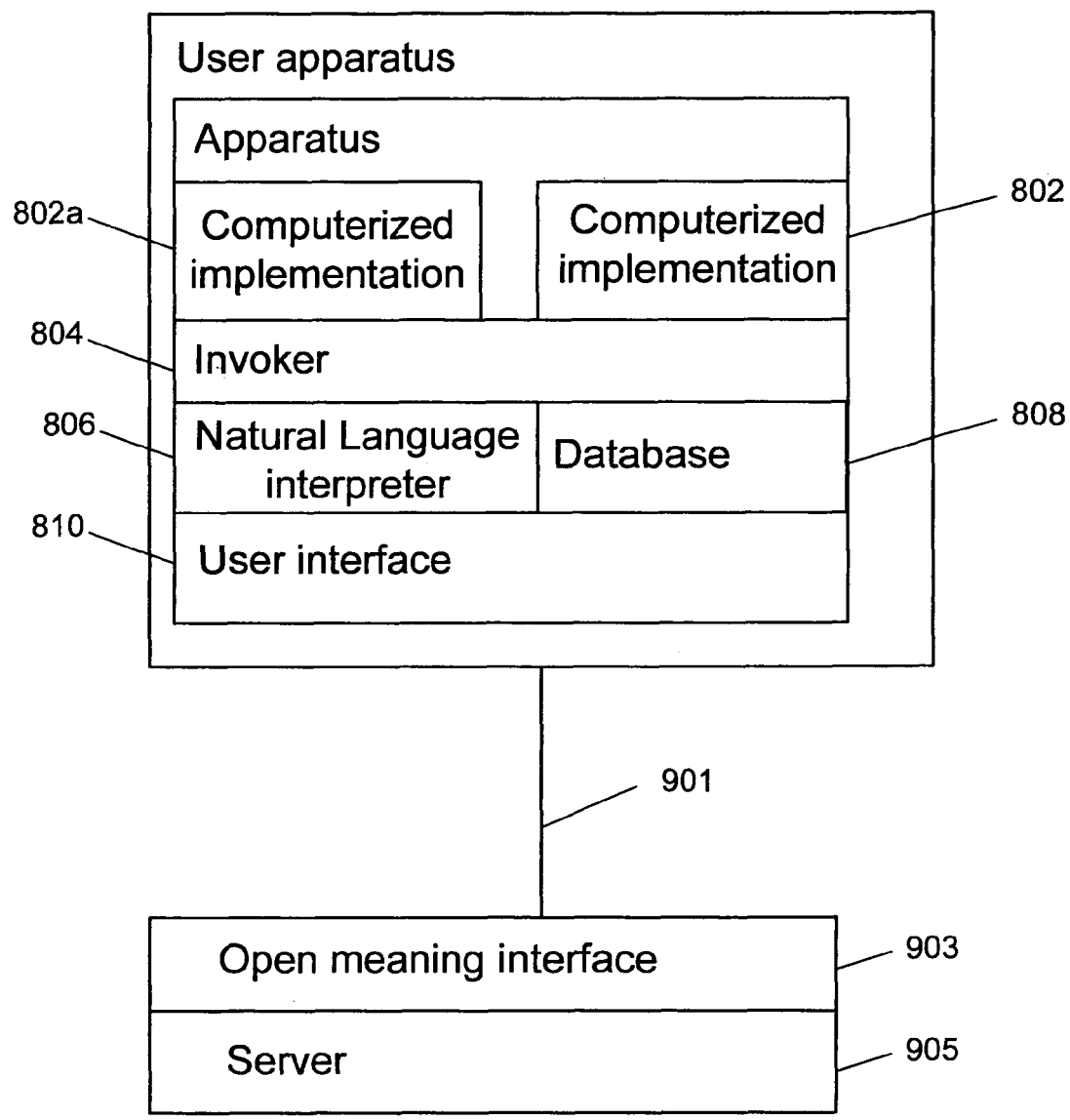
FIG. 9 shows an illustrative system according to the present invention for natural language interpretation for client-server configuration, in which the natural language interpreter is located at the client.

According to yet another embodiment of the present invention FIG. 8 relates to an exemplary, illustrative apparatus for a user interface for being operated by a user computer according to some embodiments of the present invention. As shown in FIG. 8, an apparatus 800 is operated by a computer for interactions with a human user (not shown). Apparatus 800 preferably features a user interface 810 for interacting with the human user. User interface 810 may optionally comprise any type of interface, such as a GUI (graphical user interface), speech to text, lip reading, interpretation of sign language and/or any other audio, video and/or tactile interface.

User interface 810 receives one or more commands from the user and then passes them to a natural language interpreter 806 according to some embodiments of the present invention. Natural language interpreter 806 preferably interprets the one or more requests or commands for meaning as described hereinbefore, optionally and preferably selecting at least a response from a database 808, which more preferably encompasses information regarding the unification environment. For example, if upon interpretation of the request of the client user, more than one possible response may be made, then selecting the response preferably includes selecting one or more elements from database 808 for constructing a response. A "match" to an appropriate response may also optionally be made according to the relative score and/or other method for evaluating similarity. Also optionally more than one response may be considered to be suitable. Optionally, a meaning may be selected directly from database 808 as well, for example according to the previously described hash function.

Next, Natural Language interpreter 806 preferably sends a command, more preferably with values for one or more parameters, to an invoker 804. Invoker 804 preferably functions as an interface between apparatus 800 and one or more computerized implementation 802a/802b, of which two are shown for the purpose of illustration only and without being limiting in any way. Invoker 804 passes the commands to the appropriate software program 802a/802b (optionally more than one may be appropriate), causing computerized implementation 802a/802b to perform one or more functions. Optionally, any output received from computerized implementation 802a/802b by invoker 804 is then returned to natural language interpreter 806, which preferably then packages a response with such output for display by user interface 810.

The above implementation relates to a stand-alone computational system; however it may also operate in the context of a network of computational systems, for example for a client-server configuration, as described in greater detail below.

According to still another embodiment of the present invention, the next example relates to an illustrative system according to the present invention for natural language interpretation for client-server configuration, in which the natural language interpreter is located at the client.

The user preferably issues one or more requests or commands through user interface 810, which are then preferably processed as described above. Invoker 804 may then optionally pass the command(s) to a remote location, shown as a server 905 through a computer network 901, which may optionally be the Internet and/or a cellular telephone network for example. Server 905 then preferably performs one or more functions according to the command(s), and optionally and preferably returns the result(s) to invoker 804, which may then operate as described above. For example, if server 905 comprises a search engine, as for example Google® (as a non-limiting, illustrative example), then invoker 804 may optionally send one or more search terms in a format which is suitable for the search engine function to server 905. The result(s) received then would relate to one or more search results, such as one or more links to websites or other resources located with the search (although the "null" result would also be possible).

Optionally, invoker 804 could be "tuned" or adjusted for a particular software function, for example by being adjusted to operate more effectively with regard to the search engine of server 905. For this example, the search engine function does not have a natural language interpreter according to the present invention (FIG. 10 relates to an example in which the search engine function has such an interpreter). Therefore, the input sentence or command from the user, in natural language, needs to not only be interpreted to a format suitable for the search engine, but also the keyword(s) selected are preferably adjusted for the capacity and function of the search engine.

Also optionally an open meaning interface 903 is provided at server 905, for communication with invoker 804, for example to provide a "wrapper" to support communication with natural language interpreter 806 through invoker 804. Otherwise such a "wrapper" functionality is preferably provided with invoker 804.

Figure 10:
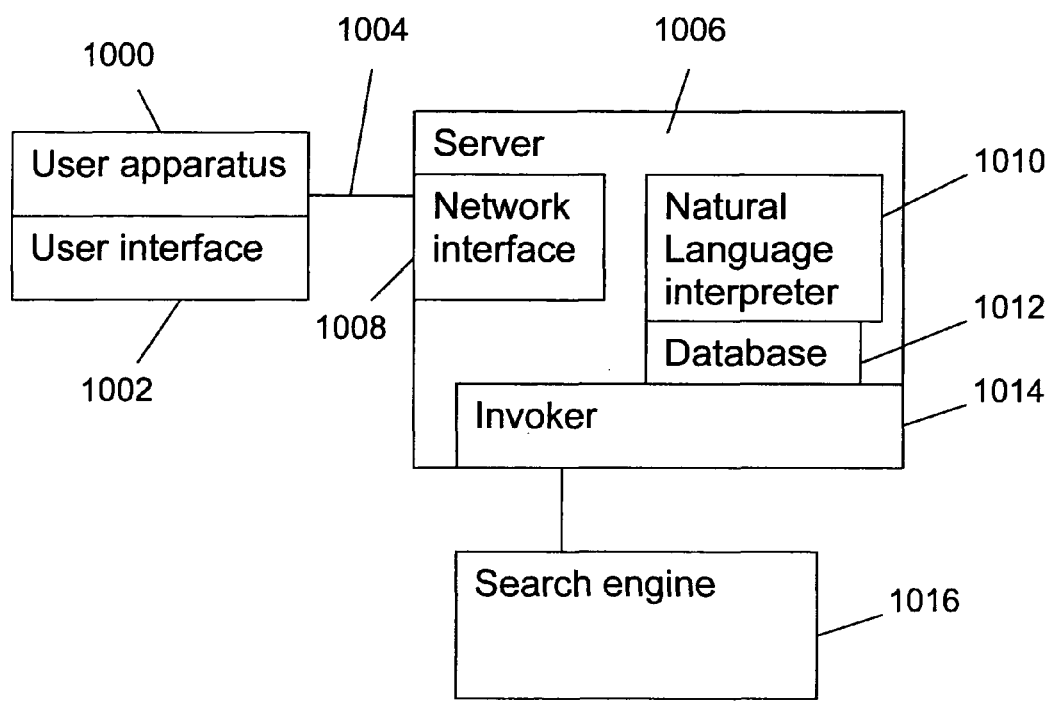
FIG. 10 shows an illustrative system according to the present invention for natural language interpretation for client-server configuration, in which the natural language interpreter is located at the server.

FIG. 10 shows another exemplary, illustrative client-server configuration according to some embodiments of the present invention, in which the natural language interpreter is located at the server.

As shown, a system features a user computer 1000 for being operated by a user. User computer 1000 preferably operates a user interface 1002 which is more preferably a Web browser and/or other software for at least viewing mark-up language documents. User interface 1002 may optionally comprise any type of interface, such as speech to text, lip reading, interpretation of sign language and/or any other audio, video and/or tactile interface.

The user preferably issues one or more requests or commands through user interface 1002, which are then transmitted to a server 1006 through a computer network 1004, which may optionally be the Internet and/or a cellular telephone network for example. Server 1006 is preferably connected to and/or is a part of and/or is in communication with a search engine 1016. Search engine 1016 preferably searches through one or more databases and/or servers and/or other resources to provide results, and may optionally be an Internet search engine, as for example (and without intending to be limited in any way) Google®.

Server 1006 preferably comprises a natural language interpreter 1010 according to the present invention. Natural language interpreter 1010 preferably interprets the one or more requests or commands, optionally and preferably selecting at least a response from a database 1012, which more preferably encompasses information regarding the unification environment. For example, if upon interpretation of the request of the user, more than one possible response may be made, then selecting the response preferably includes selecting one or more elements from database 1012 for constructing a response. A "match" to an appropriate response may also optionally be made according to the relative score and/or other method for evaluating similarity. Also optionally more than one response may be considered to be suitable. Optionally, a meaning may be selected directly from database 1012 as well, for example according to the previously described hash function.

For implementation with a search engine as shown, natural language interpreter 1010 preferably provides the interpreted term(s) to search engine 1016, more preferably through an invoker 1014, which then executes the search. The results from search engine 1016 are then preferably provided to natural language interpreter 1010, again more preferably through invoker 1014.

Next, natural language interpreter 1010 preferably packages a response to be sent to client computer 1000, optionally through a network interface 1008 as shown to network 1004. The response may optionally include written text and/or images and/or other visual information, and/or audible information (such speech for example) and/or tactile information.

Also optionally, natural language interpreter 1010 is able to consult with other natural language interpreters (not shown) and/or other unification environments in order to obtain the necessary information.

Although embodiments of the invention have been described by way of illustration, it will be understood that the invention may be carried out with many variations, modifications, and adaptations, without exceeding the scope of the claims.

The invention claimed is:

1. A method for interpreting a Natural Language by an artificial construct using constraint satisfaction problem solving, comprising:
   a) providing a plurality of ways suitable to define at least a grammar for at least a Natural Language;
   b) providing a plurality of constraint satisfaction problem instructions, wherein at least one instruction relates to at least a grammar of at least a Natural Language;
   c) providing a plurality of values for solving a plurality of constraints, wherein at least one set of zero or more values is provided during an interpreting process by the artificial construct;
   d) converting said plurality of constraints to at least one constraint satisfaction problem pattern, wherein said at least one constraint satisfaction problem pattern has a plurality of versions;
   e) receiving a Natural Language construct;
   f) unifying said plurality of constraints through said at least one constraint satisfaction problem pattern at execution runtime by the artificial construct to solve the constraint satisfaction problem, wherein said unifying is performed sequentially on each version of said plurality of versions until said constraint satisfaction problem is solved;
   g) interpreting said Natural Language construct according to a plurality of constraint satisfaction problem instructions, wherein said interpretation comprises unification; and
   h) answering to a Natural Language construct by a Natural Language construct;
   wherein said Natural Language is not restricted to any fixed language structure nor to a specific vocabulary or predefined dictionary or collection of words;
   wherein at least one of steps a) through h) are performed by a computer.

2. The method of claim 1, wherein the unifying step produces at least an object based on a plurality of constraints.

3. The method of claim 2, wherein each version of an object and its of said at least one related constraint satisfaction problem pattern comprises a plurality of conditions, and wherein said unifying process of said plurality of conditions comprises evaluating each condition to determine its validity, such that said unifying is performed until all conditions of a version are valid or until no further versions are available.

4. The method of claim 3, wherein at least one condition comprises at least one argument for determining the validity of said condition.

5. The method of claim 4, wherein at least one condition comprises at least one operator for determining a relationship between said plurality of arguments.

6. The method of claim 5, wherein the artificial construct comprises a hosting environment language for the implementation of said instructions.

7. The method of claim 6, wherein at least one condition is obtained from the hosting environment language.

8. The method of claim 7, wherein at least one condition comprises a constraint satisfaction problem pattern.

9. The method of claim 8, wherein at least one condition comprises a placeholder for receiving a value at evaluation process for unification step.

10. The method of claim 9, wherein a placeholder comprises an object.

11. The method of claim 1, wherein at least one condition comprises an alternative version of at least one constraint satisfaction problem pattern.

12. The method of claim 11, wherein the object has a type and said unifying is performed according to said object type.

13. The method of claim 1, wherein the value for said placeholder is selected from a plurality of values.

14. The method of claim 13, wherein the value for said placeholder is selected from a unification environment.

15. The method of claim 14, wherein the unification environment comprises a plurality of objects.

16. The method of claim 15, wherein the plurality of objects comprises objects at least a remote location from the artificial construct and local to the artificial construct.

17. The method of claim 16, wherein the remote location comprises a location on a computer network, wherein the artificial construct communicates with said remote location through said computer network.

18. The method of claim 1, wherein the plurality of objects is accessed according to a priority access order.

19. The method of claim 1, wherein the unification environment is modified at the evaluation process of said instructions.

* * * * *